United States Patent [19]

Delwiche

[11] Patent Number: 4,807,383
[45] Date of Patent: Feb. 28, 1989

[54] ALTERABLE, WEAR RESISTANT FISHING HOOK ASSEMBLY

[76] Inventor: Reginald J. Delwiche, P.O. Box 463, Park Falls, Wis. 54552

[21] Appl. No.: 184,356

[22] Filed: Apr. 20, 1988

[51] Int. Cl.⁴ ............................................. A01K 85/01
[52] U.S. Cl. .................................... 43/17.5; 43/42.33; 43/42.39
[58] Field of Search ............... 43/17.5, 43.31, 43.33, 43/43.34, 44.81, 44.90, 44.97, 42.25, 42.39, 42.32

[56] References Cited

U.S. PATENT DOCUMENTS

| | | | |
|---|---|---|---|
| 2,596,883 | 5/1952 | Wise | 43/42.33 |
| 3,017,307 | 1/1962 | Halliburton | 43/44.81 |
| 3,408,764 | 11/1968 | McCurry | 43/42.33 |
| 3,631,625 | 1/1972 | Castner | 43/42.33 |
| 4,450,645 | 5/1984 | Ancona | 43/44.81 |
| 4,713,907 | 12/1987 | Dudeck | 43/42.39 |

Primary Examiner—M. Jordan
Attorney, Agent, or Firm—Hovey, Williams, Timmons & Collins

[57] ABSTRACT

A jig for sport fishing includes a hook, a lead head molded to a portion of the hook and a pair of luminous, light-scattering membranes that are secured to opposite, upright, flat side walls of the head. The head has a rounded, bottom wear surface which is spaced from the membranes so that the membranes are not damaged as the jig is pulled through the water and the wear surface encounters obstacles such as rocks and the like. In use, the appearance of the jig can readily be changed to enhance the attractiveness of the jig to fish by selection of a different membrane and application of the membrane to the upright side walls of the lead head.

6 Claims, 1 Drawing Sheet

U.S. Patent  Feb. 28, 1989  4,807,383
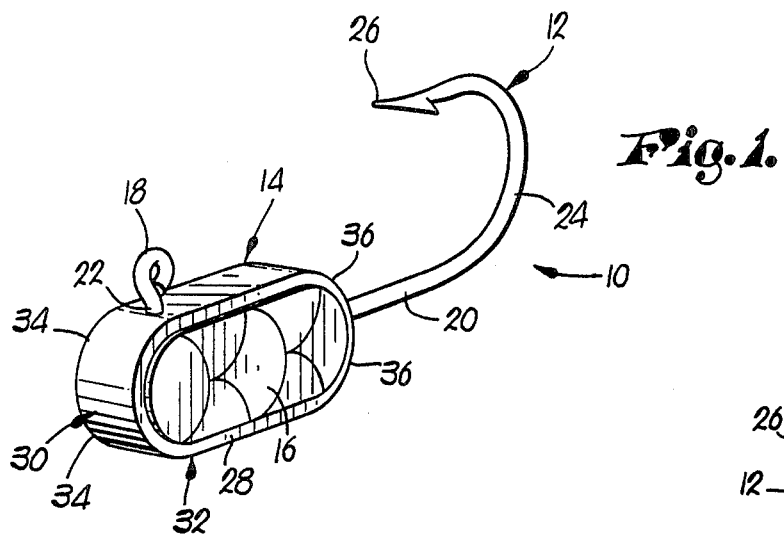
Fig.1.
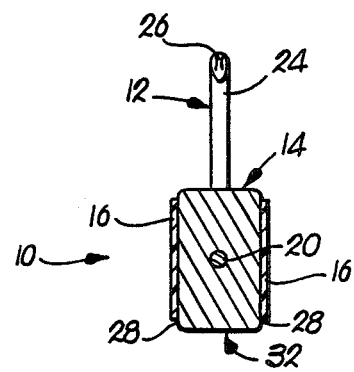
Fig.3.
Fig.2.
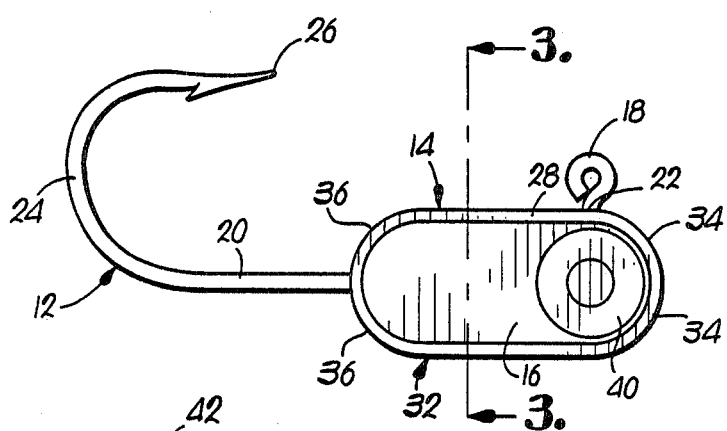
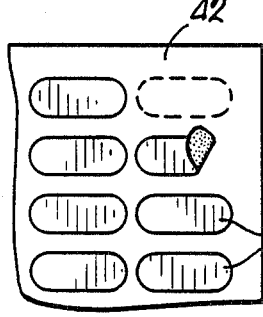
Fig.5.
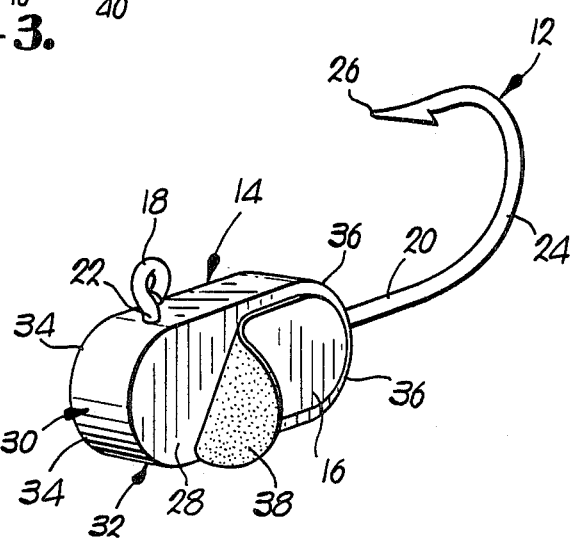
Fig.4.

ALTERABLE, WEAR RESISTANT FISHING HOOK ASSEMBLY

BACKGROUND OF THE INVENTION

1. Field of the Invention

The present invention is directed toward a jig for sport fishing that is comprised of a hook, a weighted head molded to the hook and a luminous panel affixed to one side of the head for attracting fish. More particularly, the invention is concerned with such a fishing jig having an upright, flat side and a bottom wear surface, and the membrane is of a configuration complemental to the flat side and carries a pressure sensitive adhesive for securement to the side at a location spaced from the wear surface.

2. Description of the Prior Art

The term jig is generally utilized to describe a type of lure which includes a section of lead molded around the shank or body of a hook. Jigs are universally effective for fishing, since a properly worked jig can be made to imitate a variety of baits. The jig can be fished in shallow or deep water and can be cast, trolled or drifted in a current.

The steps of jig manufacture normally involve the pouring of lead or a lead alloy into a mold to form a weighted head. Next, the entire outer surface of the head is often painted and the jig is dressed with fur, hair, rubber or plastic skirts. In some cases, however, the lead head is not finished and the jig is fished with tipped-on pork rind, plastic tails or grubs.

Typically, painting a jig head is carefully executed with special paints that are resistant to running or sagging. The jigs are often dipped into a trough for coating of the entire surface of the head, and a coating of clear lacquer may then be added to provide a glossy finish. In some instances, paint is applied to the head by means of a somewhat expensive and troublesome electrostatic painting process.

However, certain problems are normally associated with conventional, painted jigs. One noteworthy problem stems from the fact that a bottom section of the paint film may chip or wear away as the jig is dragged over abrasive obstacles such as rocks; once the integrity of the paint film is damaged in this manner, remaining sections of the film are often observed to quickly flake away as well. As a consequence, the effectiveness of such jigs is quickly diminished.

Another problem long associated with conventional jigs is the difficulty in quickly changing the appearance of the jig to adapt to particular environmental conditions. To overcome this problem, many fishermen purchase and retain on hand a wide variety of jigs having different appearances, but in addition to the problem of the added expense there is also the likelihood that a particular, desired appearance cannot be provided when needed.

SUMMARY OF THE INVENTION

My present invention relates to a fishing jig having a lead head that is molded to present a curved, bottom wear surface and two opposed, upright flat sides of oval configuration. Two thin, luminous, preferably vinyl membranes each carry a quantity of pressure sensitive adhesive for fixing the membranes to the flat sides of the jig, and as a result the appearance of the jig can easily be changed without removing the jig from the line by applying a different membrane to the sides of the lead head.

The invention readily overcomes the problems of conventional painted jigs because the side membranes are spaced from the bottom wear surface of the jig so that the membranes do not normally come into frictional contact with obstacles on the water. In preferred forms of the invention, the membranes each have an oval configuration which is slightly smaller in overall size than the complemental, oval configuration of the flat sides of the head so that substantially the entire sides of the head are covered by the luminous membrane and yet lower peripheral edges of the membrane normally avoid damaging contact with obstacles in the water. Moreover, even if small sections of the membrane are torn for some reason, the remaining sections of the membrane remain substantially unaffected in firm contact with the flat sides of the head.

As can be appreciated, my present invention affords the user with an opportunity to easily change the appearance of the jig when desired in order to optimize the likelihood of angling success. For example, if the effectiveness of a jig with a particular membrane having certain colors and/or light reflecting properties is not as great as expected for some reason or another, then the fisherman can simply apply another membrane having a somewhat different appearance over the initially installed membrane without removing the jig from the line. Moreover, certain features such as smaller, stick-on membranes in the nature of an "eye" can be secured if desired to the top of a larger membrane that covers substantially the entire flat side of the jig head.

BRIEF DESCRIPTION OF THE DRAWINGS

FIG. 1 is a perspective view of a jig or fishing hook assembly constructed in accordance with the principles of my present invention, and depicting a hook, lead head and luminous membrane of the assembly;

FIG. 2 is a side elevational view of the assembly illustrated in FIG. 1 except that a different membrane has been applied to one of the upright sides of the lead head;

FIG. 3 is an end cross-sectional view taken along line 3—3 of FIG. 2, depicting the relationship between the two opposed, flat sides of the head and the membranes affixed thereto as well as the orientation of a bottom wear surface of the head;

FIG. 4 is a perspective view of the assembly shown in FIG. 2 with a section of the luminous membrane peeled away to reveal a pressure sensitive adhesive; and FIG. 5 is a fragmentary, reduced view of a number of different membranes which are carried by a backing protecting the adhesive before installation of the membrane on the head.

DETAILED DESCRIPTION OF THE DRAWINGS

A jig or hook assembly in accordance with the invention is designated by the numeral 10 in FIGS. 1-4 and broadly includes a hook 12, a head 14 and a pair of membranes 16. Although not shown in the drawings, a fishing line is normally secured by a knot to an eye or loop 18 that is formed on one end portion of the hook 12.

The hook 12, in more detail, has a first shank portion 20 and a second shank portion 22 that integrally interconnects the loop 18 and the first shank portion 20. The first shank portion 20 extends at a right angle away from the second shank portion 22 and is integrally connected, in turn, to a curved portion 24 that presents a barbed, sharpened end 26.

The head 14 is preferably comprised of lead or a lead alloy that is molded in place around the shank portions 20, 22. The head 14 has two flat, upright side walls 28, 28 that lie in parallel planes. As can be best appreciated by reference to FIG. 2, the overall configuration of the side walls 28 is in the nature of an oval. The head 14 also has a peripheral surface 30 that interconnects the peripheral edge of each side wall 28, and the peripheral surface 30 extends in perpendicular relationship to the plane of each of the side walls 28. A lower portion of the peripheral surface 30 includes a bottom wear surface 32 which presents two rounded, leading corner regions 36 as well as two rounded, trailing corner regions 34.

Each of the membranes 16 is preferably in the nature of a relatively thin vinyl panel. One side of each membrane 16 carries a pressure sensitive adhesive 38 as illustrated in FIG. 4 for securing the membrane 16 to the flat side walls 28. Furthermore, each membrane 16 preferably has an overall configuration in the shape of an oval which is complemental to and slightly smaller than the overall shape of the side walls 28. The membranes 16 are centrally positioned on the side walls 28 in such a manner that a relatively narrow peripheral edge of each wall 28 is exposed once the membranes 16 are in place.

The luminous membranes 16 have light scattering properties for attracting fish and thereby increasing the effectiveness of the assembly 10. As one example, the membranes 16 may have an exterior, multi-prismatic face as shown in FIG. 1 with a number of flat regions that each extend in respective, different reference planes that are oriented in slight angular relationship to the plane of adjacent flat regions. As another example, each membrane 16 may present a matte or glossy finish of uniform color as is illustrated in FIGS. 2 and 4. In FIG. 2, another, somewhat smaller circular membrane 40 resembling an eye of natural bait has been applied over the top of the oval shaped membrane 16.

The adhesive 38 is advantageously comprised of a waterproof, pressure-sensitive material with sufficient strength for securely fixing the membrane 16 to the flat side walls 28. Good results have been observed in the field by use of an adhesive which includes synthetic rubber or acrylic materials.

As illustrated in FIG. 5, a number of membranes 16 are initially mounted on a protective backing 42 which covers the adhesive 38 until such time as a selected membrane 16 is to be applied to the lead head 14. The adhesive 38, in combination with the surface characteristics of the sheet of backing 42, has sufficient strength for normally retaining the membranes 16 in place on the backing 42 until needed for use, at which time selected membranes 16 may be readily peeled away and applied to one of the walls 28 of the head 14.

As can now be understood, the assembly 10 is preferable to prior art painted jigs because the luminous membranes 16 are spaced from the bottom of the lead head 14 and, in particular, are spaced away from the wear surface 32 which is normally the first part of the assembly 10 to come into contact with rocks, stumps, debris and other obstacles that may be encountered in the water. The rounded, leading corner regions 36 of the head 14 ensure that the assembly 10 smoothly rides up and over most obstacles without becoming snagged and possibly damaging the lure or snapping the line.

Moreover, the appearance of the assembly 10 can readily be altered as may be desirable under certain conditions. In this regard, membranes of different appearance may be applied over the previously existing membranes 16, or alternatively the initially installed membrane may be removed from the lead head 14 so that the selected membrane can be directly affixed to the same. This can quickly be accomplished without removing the assembly 10 from the line.

Those skilled in the art can readily perceive that many variations or modifications of my invention are possible. For example, the configuration of the hook 12 may be changed from the shape that is shown in the drawings. Also, the overall configuration of the lead head 14 may vary somewhat from my currently preferred embodiment. Accordingly, it is to be understood that the scope of the invention should be deemed limited only by a fair reading of the claims which follow along with their mechanical equivalents thereof.

What I claim is:

1. In combination:
   a fishing hook presenting a first, sharpened end portion and a second, connection end portion remote from said first end portion;
   a weighted head comprised of lead fixed to said hook between said first end portion and said second end portion,
   said head presenting a bottom wear surface and at least one substantially flat, upright, elongated side wall of a certain overall configuration;
   a membrane having opposite sides,
   one side of said membrane having luminous, light reflecting properties;
   a pressure-sensitive adhesive carried by the other side of said membrane; and
   a protective, peel-off backing initially covering said pressure-sensitive adhesive;
   said membrane having an overall configuration complemental to and slightly smaller than said certain overall configuration of said at least one upright side wall of said head for securement to said upright wall in spaced relationship to said bottom wear surface.

2. The invention as set forth in claim 1, wherein said upright walls of said head are elongated and substantially parallel to each other.

3. The invention as set forth in claim 1, wherein said overall configuration of said at least one upright side wall of said head is in the general shape of an oval.

4. The invention as set forth in claim 1, wherein said wear surface presents a leading corner region for guiding the assembly over obstacles.

5. The invention as set forth in claim 1, wherein said wear surface extends in a plane generally perpendicular to said flat, upright side wall.

6. A fishing hook assembly comprising:
   a fishing hook having a shank portion;
   a weighted head comprised of lead molded around said shank portion of said hook,
   said head presenting opposed, substantially flat, upright side walls having an overall configuration in the general shape of an oval,
   said head further presenting a bottom wear surface interconnecting said side walls;
   a pair of membranes each having an overall configuration in the shape of an oval slightly smaller than said oval-shaped configuration of said flat side walls of said head; and
   adhesive means coupling each of said membranes to a respective side wall of said head,
   each of said membranes being spaced from said bottom wear surface.

* * * * *